United States Patent [19]

Kirk

[11] Patent Number: 4,670,876

[45] Date of Patent: Jun. 2, 1987

[54] PARITY INTEGRITY CHECK LOGIC

[75] Inventor: David L. Kirk, Phoenix, Ariz.

[73] Assignee: Honeywell Inc., Phoenix, Ariz.

[21] Appl. No.: 734,295

[22] Filed: May 15, 1985

[51] Int. Cl.[4] .............................................. G06F 11/08
[52] U.S. Cl. ......................................... 371/3; 371/49
[58] Field of Search .................... 371/3, 37, 38, 49, 50, 371/51, 25; 365/222

[56] References Cited

U.S. PATENT DOCUMENTS

| | | | |
|---|---|---|---|
| 4,107,649 | 8/1978 | Kurihara | 371/3 |
| 4,223,382 | 9/1980 | Thorsrud | 371/3 |
| 4,327,408 | 4/1982 | Frissell | 371/3 |
| 4,359,771 | 11/1982 | Johnson | 371/3 |
| 4,360,915 | 11/1982 | Sindelar | 371/13 |
| 4,360,917 | 11/1982 | Sindelar | 371/49 |
| 4,531,213 | 7/1985 | Scheuneman | 371/3 |
| 4,561,095 | 12/1985 | Khan | 371/3 |

OTHER PUBLICATIONS

Cormier, et al., Computer Fault Generator, IBM Technical Disclosure Bulletin, vol. 11, No. 8, Jan. 1969, pp. 924-926.

*Primary Examiner*—Michael R. Fleming
*Attorney, Agent, or Firm*—A. A. Sapelli; J. S. Solakian; A. Medved

[57] ABSTRACT

A computer system includes at least on error detecting circuit for checking data bits and an associated check bit to verify that the data does not contain an error. An apparatus for verifying the operation of the error detection circuit comprises a generator unit operatively connected to said data lines for receiving data bits, for outputtting a verification signal and a check bit signal. The verification signal indicates the validity of the data bits during a read operation, and the check bit signal is generated during a write operation. A gate element having an input terminal to receive at least one check bit controls at least one input to the generator unit. A first control signal is transmitted to the generator unit thereby causing the check bit signal generated by the generator unit to be valid or invalid in response to the first control signal. Further, the check bit associated with the data is transmitted to the generator unit in response to a second control signal. The second control signal indicates the read operation is in process thereby permitting the generator unit to perform a checking operation independent from the first control signal, thereby permitting verification of the error detection circuit, the checking operation being the verification of the data during the read operation.

5 Claims, 5 Drawing Figures

PARITY INTEGRITY CHECK LOGIC

BACKGROUND OF THE INVENTION

This invention relates to error detection logic, and more particularly, to the verification of the error detection logic; namely, verification of parity generation and check logic.

In computer systems, data is being transferred between various components at very high rates. Usually these transfers occur in and out of a memory associated with the computer system to a central processing unit (CPU) or peripherals via a bus. In order to avoid errors, checks are generally made on the transferred data. However, for these checks to be valid, the detection circuitry must be operational.

Therefore, there is a need to provide logic which verifies the operability of these detection circuits. The verification logic included in the computer system of the present invention does not interfere with the operation of the detection circuits in a normal mode of operation.

SUMMARY OF THE INVENTION

Therefore, there is supplied by the present invention, an apparatus for verifying the operability of an error detection circuit. In a computer system, having a plurality of components including a central processing unit (CPU) which is generating data as a result of its processing function, data is being transferred between a plurality of components via data lines operatively connected to each component involved in the transfer of the data. The data includes data bits and at least one associated check bit. The computer system includes at least one error detection circuit for checking the data bits and the associated check bit to verify that the data does not contain an error. An apparatus for verifying the operation of the error detection circuit, comprises a generator unit, operatively connected to the data lines for receiving data bits, for outputting a verification signal and a check bit signal. The verification signal indicates the validity of the data bits during a read operation, and the check bit signal is generated during a write operation. A gate element, having at least one input terminal adapted to receive at least one check bit, the gate element being operatively connected to the generator unit controls at least one input to the generator unit. A first control signal is transmitted to the generator unit causing the check bit signal generated by the generator unit to be valid or invalid in response to the first control signal. Further, the check bit associated with the data is transmitted to the generator unit in response to a second control signal. The second control signal indicates that the read operation is in process thereby permitting the generator unit to perform a checking operation independent from the first control signal, thereby permitting verification of the error detection circuit, the checking operation being the verification of the data during the read operation.

Accordingly, it is an object of the present invention to provide an apparatus for verifying the operability of error detection circuits.

This and other objects of the present invention will become more apparent when taken in conjunction with the following description and attached drawings, wherein like characters indicate like parts, and which drawings form a part of the present application.

DETAILED DESCRIPTION

Figure 1:
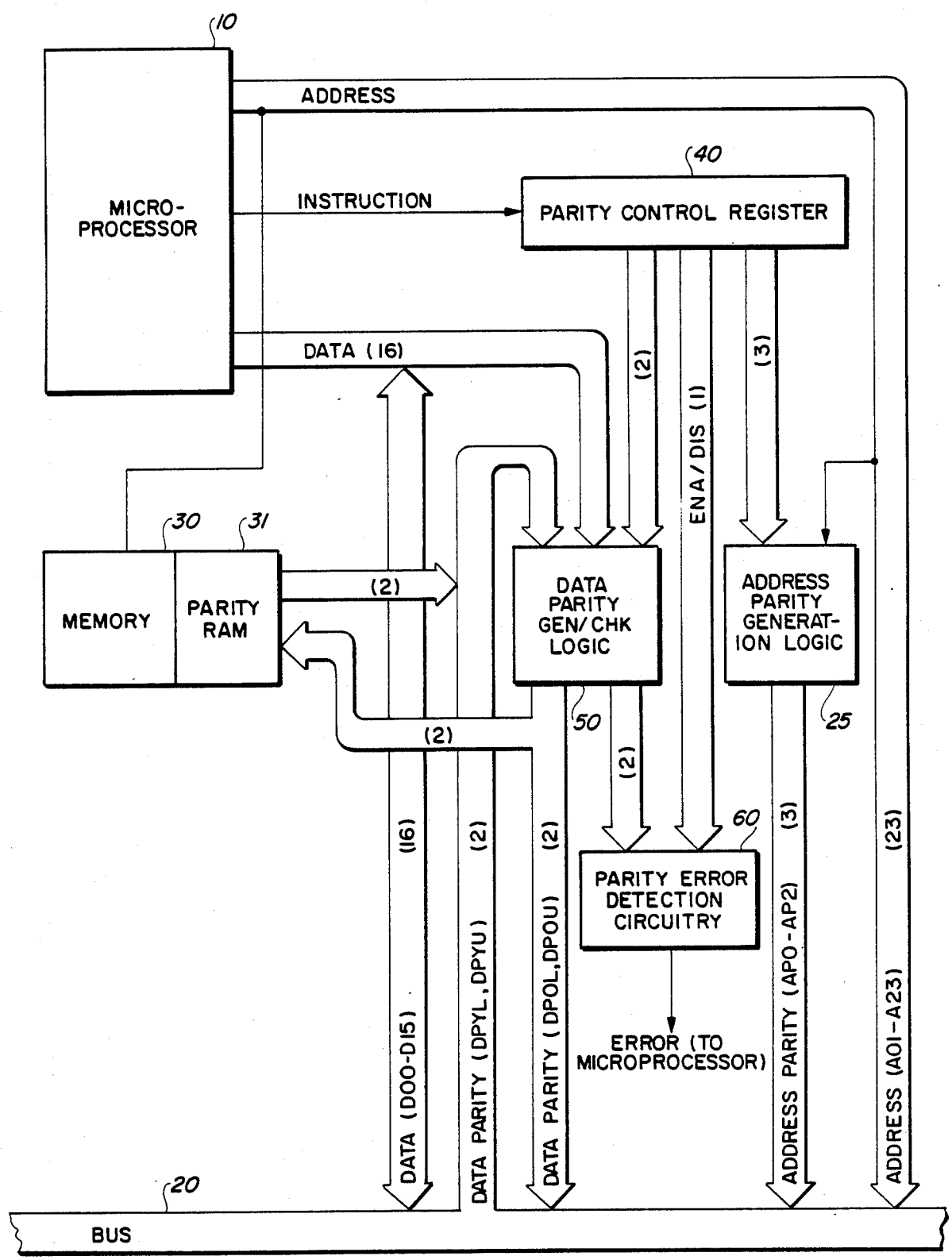
FIG. 1 shows a functional block diagram of a processing module of a computer system in which the preferred embodiment of the present invention is found.

Referring to FIG. 1, there is shown a block diagram of a processing module of a computer system, the computer system being made up of a plurality of modules. The processing module, which includes a microprocessor 10, communicates with other modules via a high speed parallel bus 20. During read, write, or read-modify-write operations by the processing module, 23 address bits (A01-A23) determine the address of the byte (or word) to be read or written. Three address parity bits (AP0-AP2) are generated by an address parity generation logic 25 for each address asserted on the bus 20 (in the preferred embodiment one parity bit for each byte of address). All other modules which interface to the bus 20 monitor the address and address parity information on the bus, each module on the bus being assigned a unique address. If the address asserted on the bus 20 matches the address assigned and the parity is correct, the module responds to the specific operation. If the address parity is incorrect there will no response from any module. The address parity check logic (not shown) on each module will prevent that module from responding if the address parity is incorrect even when there is a match between the asserted address and the modules assigned address.

Two data parity bits (DPL, DPOU) are generated for each write operation to the bus 20 or to a local memory 30 associated with the processing module. In the preferred embodiment, the parity information for the local memory 30 is stored in a 16KX two-bit parity RAM 31. During power on initialization, data parity checking on the processing module is disabled via a parity control register 40 until the parity RAM 31 can be properly initialized. The parity bits for the local memory 30 are initialized by performing read/write operations to each address of memory 30. A write operation to a memory location with the data that has been previously stored in that location (fetched during the read) sets the parity bits to the proper state for that address. After data parity checking is enabled via the parity control register 40 in response to an instruction control signal, (INSTR) from microprocessor 10, data parity is checked during all read operations from the bus 20 and from the local memory 30. Data parity generation/check logic 50 generates parity for data outputted from the microprocessor 10, and checks parity for data inputted to the processing module from bus 20 or read from local memory 30, in response to control signals from the parity control register 40. Two output lines from the data parity generation/check logic 50 are coupled to parity error detection circuitry 60. Parity error detection circuitry 60 detects the presence of parity errors in response to control signals from the parity control register 40 and generates an error signal, ERROR, and couples the error signal to the microprocessor 10.

The parity control register 40 provides the capability for the microprocessor 10 to instruct the data parity generation/check logic 50 and the address parity generation logic 25 to generate improper parity on any specified parity bit. If the data parity generation/check logic 50 has been instructed to generate bad data parity, bad parity will be generated on the first write operation immediately following the write to the parity control register 40. If the address parity generation logic 25 has been instructed to generate bad address parity, bad parity will be generated until after the first write operation immediately following the write to the parity control register 40. There is no address parity on the local address bus, therefore instructions fetched from local memory 30 during the time that the address parity generation logic 25 is generating bad address parity on the processing module will be executed in a normal manner. The first write operation to an address of a memory location contained on a module coupled to bus 20 other than the processing module will test the capability of that module to detect an address parity error. As mentioned above, that module will not respond and in this fashion the address parity generation logic 25 and address parity detection circuitry of that module is verified. The data parity generation/check logic 50 on the processing module is checked by reading a memory location in which incorrect parity has been stored. When the microprocessor 10 receives the expected error signal, ERROR, the operation of the data parity generation/check logic 50 has been verified.

Figure 2:
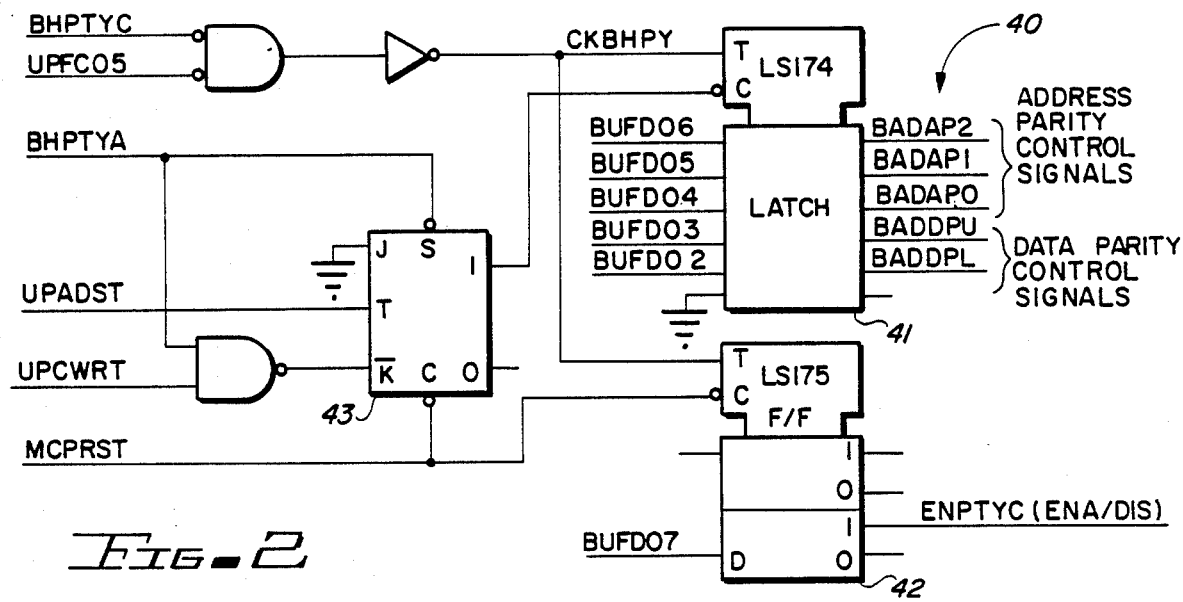
FIG. 2 shows a logic block diagram of a parity control register of the preferred embodiment of the present invention.

Referring to FIG. 2, there is a shown a logic block diagram of the parity control register 40. The parity control register 40 consists of two parts. The first part of the parity control register 40 includes a latch 41 which contain the bits specifying which byte of the address or data information is to be generated with bad parity. The second part of the parity control register 40 is implemented with a D-type flip-flop 42. The D-type flip-flop 42 contains a bit which specifies if data parity checking is to be enabled or disabled on the processing module, the enable/disable signal (ENPTYC, also denoted ENA/DIS) being coupled to the parity error detection circuitry 60. The output signals of latch 41, BADAP0-2 form the address parity control signals and are coupled to the address parity generation logic 25 and specify which byte of the address information is to be generated with bad parity, BADAPO being related to the least significant byte of the address information. The output signals of latch 41, BADDPU and BADDPL form the data parity control signals and are coupled to the data parity generation/check logic 50 and specify which byte of the data information is to be generated with bad parity, BADDPL being related to the least significant byte of data information. Both the latch 41 and the D-type flip-flop 42 are cleared following the application of a master reset signal (MCPRST). Signal BHPTYA is a signal which becomes active when the address of the parity control register 40 is decoded. Signals BHPTYC is generated by ANDing the decoded address signal BHPTYA with a write strobe, UPCWRT, the write strobe being a control signal from the microprocessor 10. Signal UPFC05, which indicates a supervisor data operation is being performed is combined with signal BHPTYC, forming the signal CKBHPY used to clock the contents of the buffered data bits, BUFD02-BUFD07, into the parity control register 40. J-K flip-flop 43 is set via the active transmission of signal BHPTYA when a write to the parity control register 40 is being performed. This removes the clear to the latch 41 and allows a parity control word (BUFD02-BUFD06) to be latched on the trailing edge of the clock signal CKBHPY. J-K flip-flop 43 remains set until a write to an address other than the parity control register 40 is performed. Signal UPADST is a signal from the microprocessor 10 which indicates a valid address is being asserted on address lines 1-23. The trailing edge of signal UPADST is used to clock J-K flip-flop 43 reset terminal if BHPTYA is not asserted and UPCWRT is a logic one (when UPCWRT is a logic one, a write operation is occurring). The microprocessor of the preferred embodiment is a Motorola 68000.

Figure 3:
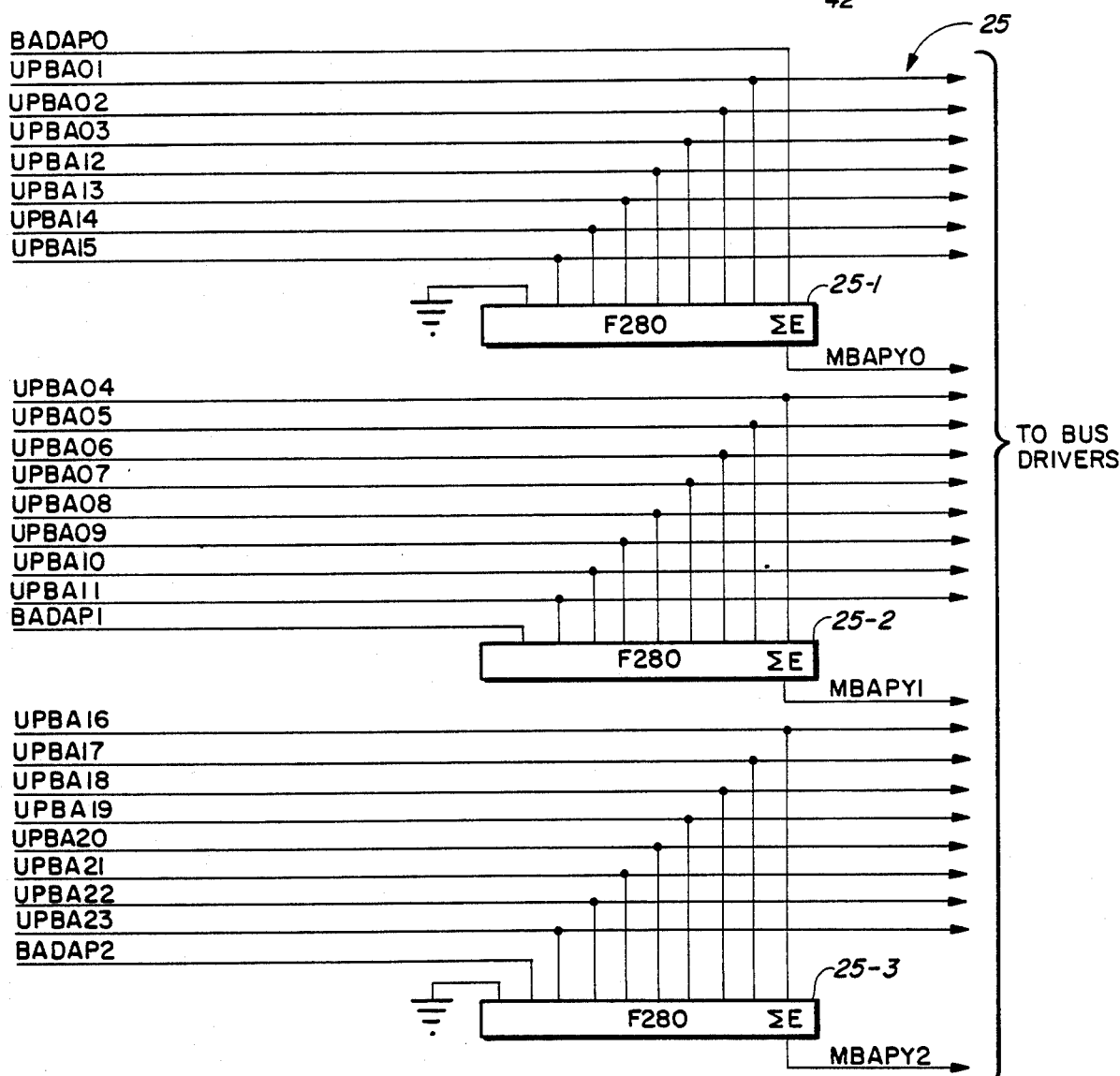
FIG. 3 shows a logic block diagram of an address parity generator of the preferred embodiment of the present invention.

Referring to FIG. 3, there is shown a logic block diagram of the address parity generation logic 25. The address parity generation logic 25 of the preferred embodiment consists of three Fairchild F280 parity generator integrated circuit chips, 25-1, 25-2, 25-3. Signals BADAP0-2 are coupled from the parity control register 40. When the signal BADAP0 is a logic zero, the proper parity is generated on the output MBAPY0, which corresponds to the address parity signal AP0. When signal BADAP0 is a logic one, the parity generator 25-1 generates an incorrect or bad parity on output MBAPYO. A similar effect occurs relative to signals BADAP1 and BADAP2, with respect to the output parity bits MBAPY1 and MBAPY2, respectively. The input signals UPBA01-PBA23 represent the address lines A01-A23.

Figure 4:
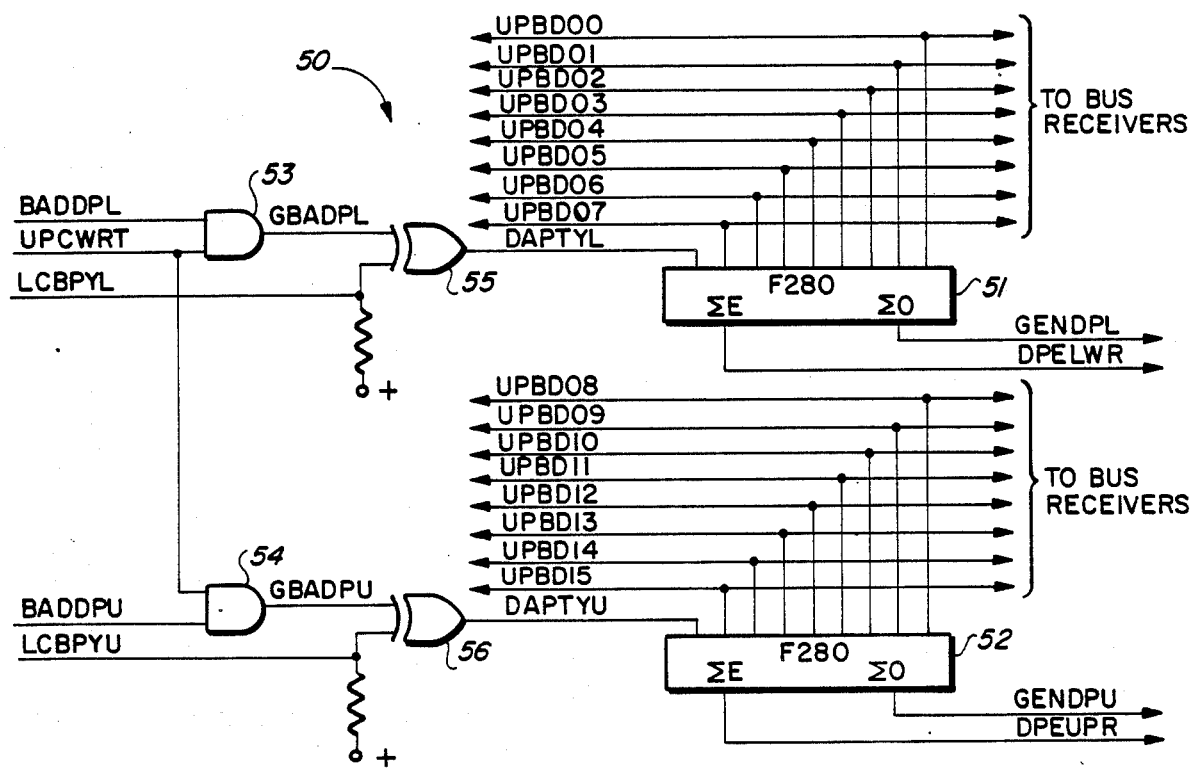
FIG. 4 shows a logic block diagram of a data parity generation and check logic of the preferred embodiment of the present invention.

Referring the FIG. 4, there is shown a logic block diagram of the data parity generation/check logic 50. A program in the microprocessor 10 is executing performing a test of the parity check logic. The program purposely commands data with bad parity to be generated and written into memory 30. While the program is executing, and the command for data with bad (or invalid) parity generation is still active, instructions are being read from memory 30 and it is desirable to read these instruction words from memory 30 without interrupting the parity check function even though the parity control register 40 is set up to command the generation of bad parity. Hence, logic is included so that once the control is set-up, the invalid parity generate function and the valid parity check function are non-interferring and without having to alternate control function in between valid and invalid parity operations since the parity generation/check logic 50 is performing both the generation and checking function.

Also, a program is also executed in microprocessor 10 to perform a test of the parity check circuitry of the other modules coupled to bus 20 other than the processing module by purposely commanding data with bad parity to be generated and written to those bus-coupled-modules. Under this situation an error signal (not shown) is expected to be returned from the module's parity error detection circuit 60' (not shown) to mircroprocessor 10 in response to the write operation with incorrect parity, thereby checking the ability of that module's parity error detection circuit 60' to detect and report data parity errors.

The data parity generation/check logic 50 of the preferred embodiment of the present invention is comprised of two Fairchild F280 parity generators 51, 52, two AND gates 58, 54, and two exclusive-OR gates 55, 56 which allow incorrect data parity to be generated during write operations and data parity checking to be performed correctly during read operations without having to modify the input control signals from the parity control register 40 while a test is being performed requiring both read and write operations. The parity generators 51, 52 generate parity, GENDPL, GENDPU, during write operations, and check parity during read operations, DPELWR and DPEUPR. The generated parity signals GENDPL and GENDPU are coupled to bus drivers (not shown) and memory 30, and the parity indicator signals DPELWR and DPEUPR are coupled to the parity error detection circuitry 60.

When proper data parity is to be generated, signals BADDPL and BADDPU from parity control register 40 are a logic zero. This causes GBADPL and GBADPU to be a logic zero and further causes DAPTYL and DAPTYU to be a logic one (or high). Input signals LCBPYL and LCBPYU are a logic one for write operations since the parity RAM 31 output and module bus receiver (not shown) are tristated during this period of time. Since DAPTYL is a logic one the sum 0 output of parity generator 51 will generate the correct parity.

A logic one for the signal BADDPL will cause improper parity to be generated on GENDPL for write operations. This is because GBADPL is a logic one resulting in DAPTYL being a logic zero. A similar relationship holds true between signals BADDPU and GENDPU. Parity checking is not affected by the state of the signals BADDPL or BADDPU since signal UPCWRT is a logic zero during read operations.

During read operations the parity bit is contained in signals LCBPYL and LCBPYU received from the bus receivers (not shown) or the parity RAM 31 output. The state of LCBPYL and LCBPYU are reflected in the state of DAPTYL. Hence if all the eight input bits UPBD00-UPBD07 plus the parity bit LCBPYL are an odd number of bits in the logic one state the sum E output is low, i.e., DPELWR is low, indicating no error for the read. The number of logic ones presented on the inputs of the respective parity generators 51, 52 are reflected in the respective outputs sum E and sum 0 of the respective parity generators 51, 52. There should be an odd number of ones present if the parity is correct for the data presented. Therefore, DPELWR and DPEUPR should be low, or a logic zero. These parity check output signals are coupled to the parity error detection circuitry 60.

Figure 5:
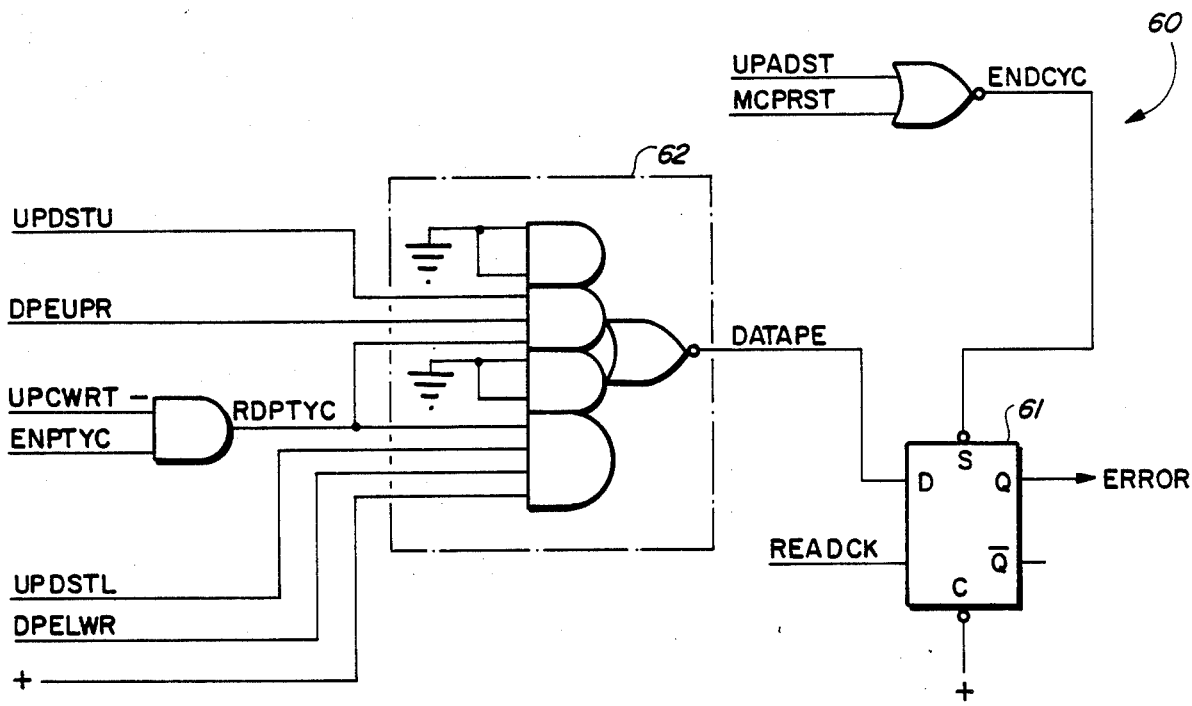
FIG. 5 shows a logic block diagram of a parity error detection circuit of the preferred embodiment of the present invention.

Referring to FIG. 5, there is shown a logic block diagram of the parity error detection circuit 60. Signals DPELWR and DPEUPR are allowed to pass through gate 62 if parity checking is enabled, i.e., signal ENPTYC from parity control register 40 is a logic one, upper and lower data strobe signals from the microprocessor 10 (UPDSTU and UPDSTL) are asserted, and a read operation is occurring, i.e., UPCWRT- is high. A clock signal, READCK, clocks the data parity flip-flop 61 after sufficient time has passed for signal DATAPE to have been stable for at least some predetermined period of time. If an error in the parity has been detected, the error signal, ERROR, is outputted to the microprocessor 10.

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

I claim:

1. In a computer system having a plurality of modules including a processing module, said processing module including a plurality of circuit components, one circuit component being a CPU for executing instructions, for generating control signals, and for producing sets of binary data signals and sets of binary address signals, said sets of signals being transferred between circuit components of a module via data and address lines and between modules connected to a module bus via the module bus, the sets of data signals transmitted over the module bus and the sets of data signals from addressable circuit components of a module capable of storing sets of data bits including a parity bit associated with each such set of data bits, each module including parity error detection circuit means for checking the validity of a set of bits and the set's associated parity bit; an apparatus for verifying the operation of the parity error detection circuits comprising:

parity control register means for receiving control bits and a set of data bits from the CPU and for producing in response thereto binary parity control signals and a binary enable/disable control signal under the control of the CPU;

data parity and parity error check generator means operatively connected to the data lines of the processor module for receiving as inputs a set of data bits asserted on the data lines and for outputting a parity bit for the set of data bits applied during a write operation in execution by the CPU and for outputting a check bit indicating the validity of a set of data bits and the set's associated parity bit applied to the generator means when the CPU is executing a read operation; and gate means for controlling one input signal to the data parity generator, said gate means having applied to it a parity control signal from the parity control register means, a binary read/write control signal from the CPU and a parity bit associated with a set of data bits asserted on the data lines, said gate means causing the parity bit produced by the generator means to be valid if the read/write control signal has a value denoting a write operation is in process, and if the parity control signal has one value, and the parity bit produced to be invalid under the same conditions if the parity control signal has its other value, said gate means causing the check bit signal produced by the generator means to be valid if the read/write control signal has a value denoting a read operation is in execution and if the parity bit applied to the gate means is valid and for the check bit signal produced by the generator means to be invalid under the same conditions if the parity bit applied to the gate is invalid, whereby the CPU can cause the data parity and parity error check generator means to produce an invalid parity bit for a set of data bits, write that set of data bits and its invalid parity bit into an addressable location in a circuit component of the processor module, read the set of data bits and its associated parity bit from the location in which it is stored in the circuit component to check the operation of a data parity error check generator.

2. An apparatus for verifying the operation of the parity error detection circuits according to claim 1, further comprising:

error detection means operatively connected to said data parity and parity error check generator means and to the parity control register for outputting an error signal in response to the parity control register producing an enable signal and the data parity and parity data check generator means producing an invalid check bit, and circuit means for applying the error signal to the CPU.

3. An apparatus for verifying the operation of parity error detection circuits according to claim 2 further comprising address parity generator means operatively connected to the address lines for receiving a set of address bits asserted on the address line and for outputting a parity bit for the set of address bits applied, said address parity generator means producing a valid parity control bit if a parity control bit applied to the address parity generator from the parity control register means has one value and an invalid parity bit if the address parity control bit has its other value.

4. An apparatus for verifying the operation of parity error detection circuits according to claim 3 in which a set of address signals and the sets associated parity signal is asserted only on the module bus to check the operation of parity error detection circuits of a module connected to the module bus.

5. An apparatus for verifying the operation of parity error detection circuits according to claim 4 in which the number of bits in a set of bits is eight.

* * * * *